Figure 1:
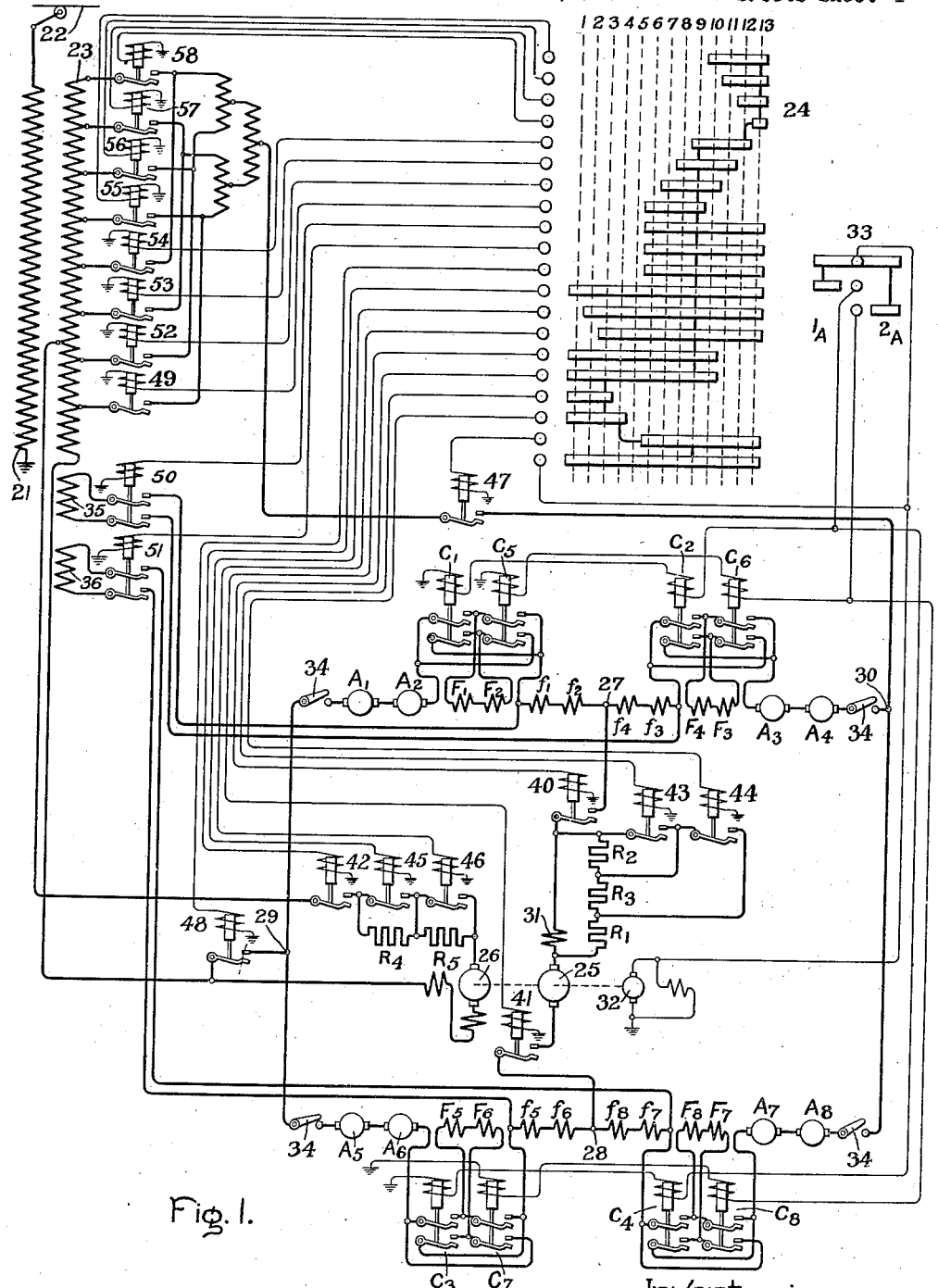

Nov. 24 1925.

E. F. W. ALEXANDERSON 1,563,004

METHOD OF AND MEANS FOR OPERATING ELECTRIC MOTORS

Filed June 12, 1924        2 Sheets-Sheet 1

Inventor:
Ernst F. W. Alexanderson,
by *Alexander S. [Lunt]*
His Attorney.

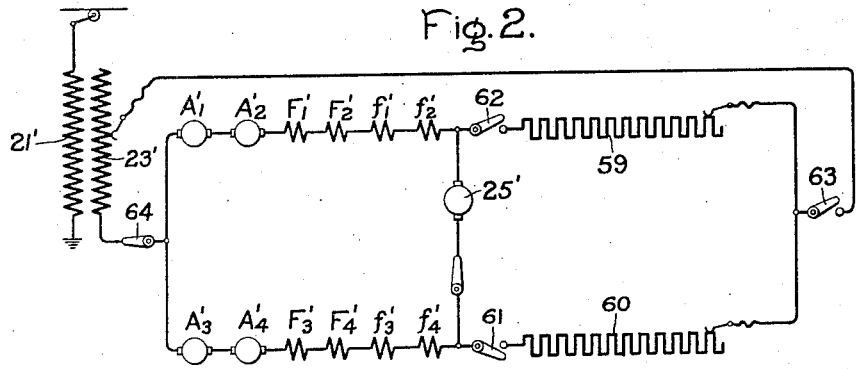
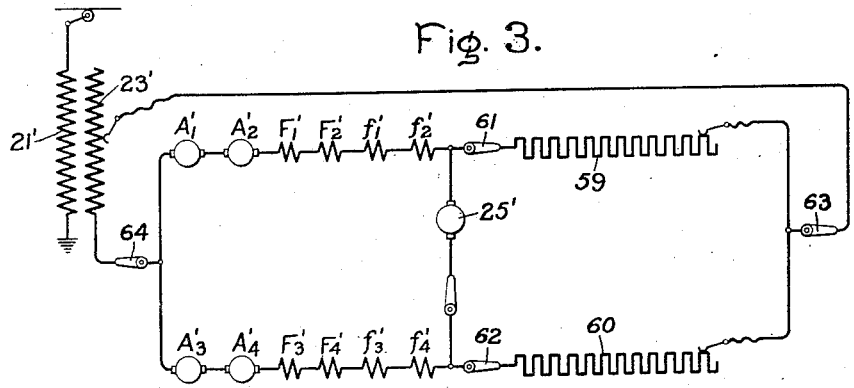
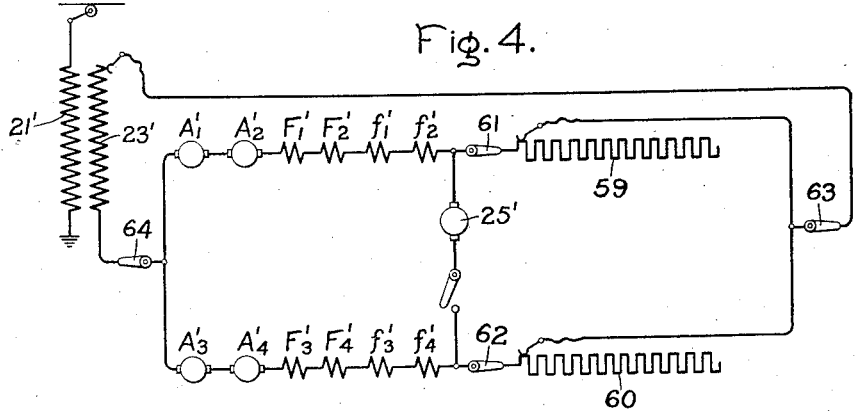

Patented Nov. 24, 1925.

1,563,004

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

METHOD OF AND MEANS FOR OPERATING ELECTRIC MOTORS.

Application filed June 12, 1924. Serial No. 719,680.

*To all whom it may concern:*

Be it known that I, ERNST F. W. ALEXANDERSON, a citizen of the United States, residing at Schenectady, in the county of Schenectady, State of New York, have invented certain new and useful Improvements in Methods of and Means for Operating Electric Motors, of which the following is a specification.

My invention relates to a method of and means for operating electric motors, and is particularly applicable to the operation of motors of the series type.

Alternating current motors as commonly employed in railway service are designed to develop the large starting torque necessary to put the car or train in motion and are consequently series motors of the commutator type. Such motors always commutate badly under starting conditions. This is due to the fact that there is a transformer electromotive force, produced in the portion of the armature winding short-circuited by the brushes, which cannot be compensated for at starting. In order to reduce these commutation difficulties to a minimum, it has been the practice heretofore to compromise the design of such motors, as for instance, by designing them so that they operate with a low flux, which requires that they be unduly large and expensive.

My invention has for its object to avoid such difficulties and consists in a novel method of and means for operating such a series commutator motor whereby it may develop a large starting torque with good commutation under all conditions without the necessity of making any compromise in its design, as pointed out above.

In accordance with one aspect of my invention, I employ a motor which may be operated by either direct or alternating current, as for example, a series motor of the commutator type, and operate it by initially supplying direct current to it in order to start the same and thereafter simultaneously applying direct current and alternating current to the motor during its acceleration. Under such operating conditions, a motor of the series type starts as a direct current motor with a large starting torque and commutates well, and the compromise design referred to above is not necessary. During acceleration, I apply to the motor both direct current and alternating current, which has proven to be particularly favorable for commutation.

My invention also comprises a novel arrangement of the motor circuits whenever a sufficient number of motors are employed. In accordance with this aspect of my invention, the motors are connected in parallel circuits to which a source of direct current is initially connected to start the motors as direct current motors, and thereafter a source of alternating current is connected to equipotential points of said circuits with reference to the direct current source to accelerate the motors, the direct current source being connected to equipotential points of said circuits with reference to the alternating current source.

Other features of novelty which characterize my invention are pointed out with particularity in the claims annexed to and forming a part of this specification. For a better understanding of my invention, reference may be had to the following description, taken in connection with the accompanying drawing, in which Fig. 1 is a diagram of connections in which my invention is embodied; and Figs. 2, 3 and 4 are diagrams showing a modification of the connections of Fig. 1.

In Fig. 1 of the drawing I have illustrated motors of the series type as usually employed in railway service. They are shown as having armatures $A_1$, $A_2$,—$A_7$, $A_8$, exciting fields $F_1$, $F_2$,—$F_7$, $F_8$, and commutating or compensating field windings $f_1$, $f_2$,—$f_7$, $f_8$. A source of alternating current, illustrated as a transformer, has its primary winding 21 connected between a trolley wire 22 and the ground and its secondary winding 23 connected to the motors by means of a controller 24 as will be hereinafter explained. A source of direct current, shown as a generator 25, is also connected to the motors by means of the controller 24. The generator 25 is shown as driven by an alternating current motor 26, also connected to the same source of alternating current supply as the main motors.

In accordance with one aspect of my invention, where a number of motors are used, the motors $A_1 F_1 f_1$, $A_2 F_2 f_2$,—$A_7 F_7 f_7$, $A_8 F_8 f_8$ are interconnected in parallel circuits and arranged as a Wheatstone bridge, with the generator arranged to be connected initially across one diagonal, to the points 27, 28, to start the motors as direct current motors and with the secondary 23 of the transformer arranged to be connected across the other diagonal, to the points 29, 30, after the applied direct current voltage has been increased and with the connection of the generator 25 maintained during the acceleration of the motors. The points 29 and 30 are equipotential points with respect to the direct current source and the points 27 and 28 are equipotential points with respect to the alternating current source. The alternating current voltage applied to the motors is then increased, still further increasing the speed of the motors. If the direct current voltage is not increased as the motors speed up, the amount of direct current taken by the motors gradually decreases until it is practically nil, whereupon the source of direct current may be disconnected from the motors if desired.

Consider, for instance, a motor of the series type, having a synchronous speed of 500 R. P. M., and maximum operating speed of about 1200 R. P. M. In accordance with my invention, such a motor is started and attains a low speed, say 100 R. P. M., as a direct current motor, under which conditions it operates satisfactorily and commutates without any sparking under the brushes. As the motor is speeded up, say from 100 to 400 R. P. M., with no further increase in the direct current voltage, by superimposing an alternating voltage, it has been found to continue to operate with favorable commutation characteristics. The application of alternating current during the acceleration of the motor will tend to saturate the field of the motor, but this will not decrease the torque developed by the motor, but if anything, will increase the torque, since the motor will draw more current from the direct current source that it would at the same speed, if it were fed by direct current alone, due to the fact that the field is being saturated by the alternating current and consequently, it requires more direct current to produce the field strength that corresponds to the impressed direct current voltage. The alternating current varies from zero, at say 100 R. P. M., up to three-quarters of its maximum value at say 400 R. P. M., and it has been found that the alternating current produces less sparking than if the same value of alternating current were applied alone. The reason for this is that the field is saturated with direct current and therefore the electromotive force produced in the armature by the alternating current excitation is lower than it would be with the same number of amperes of pure alternating current. As the alternating current voltage applied to the motor is increased, the motor continues to speed up, from say 400 R. P. M. to 1200 R. P. M. and operates as a pure alternating current motor, the counterelectromotive force due to the direct current excitation preventing any substantial flow of direct current. The commutation of the motor has been found to remain good up to its maximum speed.

I have also found that a very substantial improvement in commutation was obtained if the motor was run as a pure direct current motor up to a much lower speed than that indicated above, and it will depend upon the character of service what amount of direct current power will be desirable for starting.

The source of direct current is shown as a series generator 25 having resistances $R_1$, $R_2$, $R_3$ in shunt to its series field winding 31. This generator may be of any well known type however. In the operation of my invention, any suitable source of direct current may be employed and in systems in which the direct current is derived from the source of alternating current, a rectifier of any well known type may be used, as for instance, a motor generator or a rectifier of any well known type, as for instance, a mechanical rectifier, or a space current rectifying device, or any suitable translating device. The motor 26 driving the generator 25 is shown as of the series compensated type with resistances $R_4$ and $R_5$ in series therewith to control its speed. This motor may be of any well known type. It may also drive a small generator 32 for supplying the control circuits with current. In order to reverse the direction of rotation of the motors $A_1$ $F_1$ $f_1$, $A_2$ $F_2$ $f_2$,—$A_8$ $F_8$ $f_8$, their exciting field windings $F_1$, $F_2$,—$F_7$, $F_8$ are reversed by contactors $C_1$, $C_2$,—$C_7$, $C_8$, controlled by a reversing switch 33. When the reversing switch is moved into position $1_A$, the contactors $C_1$, $C_2$, $C_3$, $C_4$ are energized and pick up to connect the field windings $F_1$, $F_2$,—$F_7$, $F_8$ in one direction with reference to the armatures $A_1$, $A_2$,—$A_7$, $A_8$, and when moved into position $2_A$, the contactors $C_5$, $C_6$, $C_7$ and $C_8$ are energized to connect the field windings $F_1$, $F_2$,—$F_8$ in the reversed direction with reference to the armatures $A_1$, $A_2$—$A_8$.

In order to start the motors into operation, the manual switches 34 are first closed and then the reversing switch 33 is thrown to one of its two positions, depending upon the direction it is desired that the motors run. The controller 24 is moved to position 1, whereupon contactors 40, 41, 42, 43 and 44 are energized, closing the respective circuit which they control. The motor 26 is thus started into rotation with the resistance $R_4$ and $R_5$ in circuit therewith, driving generator 25. The generator 25 will be connected to the motors $A_1$ $F_1$ $f_1$, $A_2$ $F_2$ $f_2$,—$A_8$ $F_s$ $f_s$ in two parallel paths as will be readily seen from the drawing. The generator field winding 31 will only be shunted by resistance $R_1$. The motors $A_1$ $F_1$ $f_1$—$A_s$ $F_s$ $f_s$ will develop a torque as pure direct current motors and come up to a low speed, and since the motor generator is operating at a low speed, the output of the generator is limited by the torque of the motor 26. The controller 24 is then moved successively into positions 2 and 3, successively energizing contactors 45 and 46, thereby cutting out resistances $R_4$ and $R_5$ out of the circuit of motor 26. The motor of the motor generator set now develops a greater torque and causes the motors $A_1$ $F_1$ $f_1$,—$A_s$ $F_s$ $f_s$ to run at a higher speed. Moving the controller into positions 4 and 5 successively deenergizes contactors 43 and 44, thus opening the shortcircuit about resistances $R_2$ and $R_3$ and causing more current to flow through the field 31 of generator 25, thereby still further increasing the direct current voltage generated by the generator 25, with a consequent further increase in the speed of motors $A_1$ $F_1$ $f_1$,—$A_s$ $F_s$ $f_s$. Moving the controller into position 6 energizes contactors 47, 48 and 49. Energization of these contactors connects the lowest tap of the secondary of 23 of the transformer across the other diagonal 29, 30 of the Wheatstone bridge arrangement of the motors and thus superimposes alternating current in two parallel paths in the circuit of the motors $A_1$ $F_1$ $f_1$,—$A_s$ $F_s$ $f_s$, so that they now still further accelerate due to the alternating current. In this position of the controller, contactors 50 and 51 are also energized, thereby impressing on the compensating fields $f_1$, $f_2$—$f_7$, $f_8$, an alternating current voltage from the portions 35 and 36 of the secondary of the transformer in order to properly modify the field produced by the compensating field windings. As the controller is moved successively into positions 7, 8, 9 and 10, the contactors 52, 53, 54 and 55 are successively closed, thereby gradually increasing, step by step, the alternating current voltage applied to the motors $A_1$ $F_1$ $f_1$, —$A_s$ $F_s$ $f_s$. This increase in the alternating current voltage is superimposed upon the direct current voltage also supplied these motors. This gradually increased alternating current voltage accelerates the motors still further and since there has been no further increase in direct current voltage after position 5 of the controller, the motors in position 10 of the controller are running as substantially pure alternating current motors, the direct current flowing through the motors having gradually decreased, due to the increase in the direct current counter electromotive force. Therefore, if desired, in the further acceleration of the motors by the alternating current, the source of direct current may be disconnected from the motors, and in the drawing, in position 11 of the controller, the contactors 40 and 41 are deenergized, thereby disconnecting the direct current generator from the motors. In this position of the controller the alternating current supplied the motors is still further increased by the closing of contactor 56, thereby connecting the motors to a still higher voltage tap on the transformers. In positions 12 and 13 of the controller, the contactors 57 and 58 are successively closed, thereby still further increasing the alternating current voltage applied to the motors and consequently the speed of the motors. In position 11, 12 and 13 of the controller, only alternating current is supplied to the motors and they consequently run as pure alternating current series motors.

I desire it to be understood that in practice a larger number of steps of resistance would be employed in series with the motor 26 and in shunt to the generator field 31, that a larger number of taps would be employed in the secondary 23 of the transformer and that two steps of alternating current voltage may be applied to the compensating fields $f_1$ and $f_8$ as the alternating current voltage applied to the motors is increased.

The Wheatstone bridge arrangement described in connection with Fig. 1 is particularly applicable to a locomotive provided with eight or twelve motors. A four motor locomotive can be arranged in the same way, but such an arrangement is not economical in practice because the current generated by the generator 25 is twice as great as the current flowing through any one motor. In the arrangement of Figs. 2, 3, and 4, I have shown an arrangement in which the direct current generator 25' need furnish only the same current as flows in each motor when starting. The arrangement of these figures may be used with any even number of motors.

In these figures of the drawing, four motors $A'_1$ $F'_1$ $f'_1$,—$A'_4$ $F'_4$ $f'_4$, are interconnected and arranged as a Wheatstone bridge with two motors in each of two adjacent sides of the Wheatstone bridge and adjustable resistances 59 and 60 in the other two adjacent sides of the Wheatstone bridge. The generator 25' is similar to the generator 25 of Fig. 1 and may be similarly driven, and the motors $A'_1$ $F'_1$ $f'_1$,—$A'_4$ $F'_4$ $f'_4$ are similar to the motors of Fig. 1 with exciting and compensating field windings. In order to reverse these motors reversing switches, such as shown in Fig. 1 for the exciting fields may also be provided. The source of alternating current in these figures is illustrated as a transformer having a primary winding 21' and a secondary winding 23'. In Fig. 2, the connections of the motors corresponding to positions 1 to 5 of the controller of Fig. 1, are illustrated. The motors are started and accelerated as pure direct current motors and the resistances 59 and 60 are disconnected from the circuit of generator 25' by the switches 61 and 62. After the applied direct current voltage has been increased, the resistances 59 and 60 are connected to the generator and motor circuits. The point 63 midway between the resistances 59 and 60 and the point 64 midway in the circuit of the motors are connected across the low voltage tap of the secondary 23' of the transformer, as shown in Fig. 3. The points 63 and 64 are equipotential points of the direct current circuit. The direct current generator is connected to the circuit of the motors and resistances at substantially equipotential points of the alternating current circuit, the resistances 59 and 60 being of such a value that when the motors are running with the maximum direct current voltage and connected as shown in Fig. 3, one third to one half of the direct current will flow through the resistances.

The connections of Fig. 3 corresponds to the connections of Fig. 1 when the controller is in position 6. With the motors connected as in Fig. 3, a portion of the direct current will be diverted from the motors into the resistances 59 and 60, but alternating current will also flow through the motors and these resistances. The motors therefore will deliver the same torque with the combination of alternating and direct current as they did on pure direct current.

The alternating current voltage applied to the motors will then be increased as in positions 7 to 10 of the controller of Fig. 1 thus increasing the speed of the motors. As the direct current voltage is not increased as the alternating current voltage is increased, the amount of direct current taken by the motors gradually decreases until it is practically nil, whereupon the source of direct current may be disconnected from the motors as shown in Fig. 4.

After the disconnection of the direct current generator, the resistances 59 and 60 may be cut out of circuit still further increasing the alternating current voltage applied to the motors and consequently their speed. The motors will now run as pure alternating current series motors, and the alternating current voltage applied to them may be increased to the maximum as is done in positions 11 to 13 of the controller of Fig. 1.

I desire it to be understood that other changes may be made in the system shown and described, and I aim in the appended claims to cover all modifications which do not depart from the spirit and scope of my invention.

What I claim as new and desire to secure by Letters Patent of the United States is:—

1. The method of operating a series commutator electric motor which consists in initially supplying direct current to said motor for starting the same and thereafter simultaneously applying both direct current and alternating current to said motor during the acceleration of the motor.

2. The method of operating a series commutator electric motor which consists in initially supplying direct current to said motor for starting the same, thereafter simultaneously applying both direct current and alternating current to said motor during the acceleration of the motor, and then operating said motor by alternating current when it is up to speed.

3. The method of operating a series commutator electric motor which consists in initially supplying direct current to said motor to start the same, then increasing the direct current voltage applied to said motor to increase its speed, thereafter applying alternating current to said motor in addition to direct current to further increase the speed of said motor, and then increasing the alternating current voltage applied to said motor for normal operation.

4. In combination, a source of alternating current, a source of direct current, a series commutator motor constructed and arranged to operate normally from said alternating current source, means for initially connecting the motor to the source of direct current for starting, and means for thereafter applying the source of alternating current to the motor with the connection of the direct current source maintained during the acceleration of said motor.

5. In combination, a source of alternating current, a source of direct current, a series commutator motor constructed and arranged to operate normally from said alternating current source, means for initially connecting the motor to the source of direct current for starting, means for increasing the direct current voltage applied to said motor to increase the speed of said motor, and means for thereafter applying the source of alternating current to the motor with the connection of the direct current source maintained during the acceleration of said motor.

6. In combination, a source of alternating current, a source of direct current, a series commutator motor constructed and arranged to operate normally from said alternating current source, means for initially connecting the motor to the source of direct current for starting, means for increasing the direct current voltage applied to said motor to increase the speed of said motor, means for thereafter applying the source of alternating current to the motor with the connection of the direct current source maintained during the acceleration of said motor, and means for increasing the alternating current voltage applied to said motor for normal operation.

7. In combination, a source of alternating current, a source of direct current, a plurality of series commutator motors interconnected and arranged as a Wheatstone bridge, means for initially connecting said source of direct current across one diagonal of the Wheatstone bridge to start said motors as direct current motors, and means for connecting said source of alternating current across the other diagonal of said Wheatstone bridge after said motors have started with the connection of the direct current source maintained during the acceleration of said motors.

8. In combination, a source of alternating current, a source of direct current, a plurality of series commutator motors interconnected and arranged as a Wheatstone bridge, means for initially connecting said source of direct current across one diagonal of the Wheatstone bridge to start said motors as direct current motors, means for increasing the direct current voltage applied to said motors to increase the speed of said motors, and means for connecting said source of alternating current across the other diagonal of said Wheatstone bridge after the applied direct current voltage has been increased with the connection of the direct current source maintained during the acceleration of said motors.

9. In combination, a source of alternating current, a source of direct current, a plurality of series commutator motors interconnected and arranged as a Wheatstone bridge, means for initially connecting said source of direct current across one diagonal of the Wheatstone bridge to start said motors as direct current motors, means for increasing the direct current voltage applied to said motors to increase the speed of said motors, means for connecting said source of alternating current across the other diagonal of said Wheatstone bridge after the applied direct current voltage has been increased with the connection of the direct source maintained during the acceleration of said motor, and means for increasing the alternating current voltage applied to said motors.

10. The method of operating a series commutator electric motor which consists in initially supplying direct current to said motor to start the same, then increasing the direct current voltage supplied to said motor to increase its speed, and thereafter applying alternating current to said motor in addition to direct current without any further increase in the direct current voltage to further increase the speed of said motor.

11. The method of operating a series commutator electric motor which consists in initially supplying direct current to said motor to start the same, then increasing the direct current voltage supplied to said motor to increase its speed, thereafter applying alternating current to said motor in addition to direct current without any further increase in the direct current voltage to further increase the speed of said motor, and then further increasing the alternating current voltage applied to said motor to further accelerate said motor.

12. The method of operating a series commutator electric motor which consists in initially supplying direct current to said motor to start the same, then increasing the direct current voltage supplied to said motor to increase its speed, thereafter applying alternating current to said motor in addition to direct current without any further increase in the direct current voltage, then increasing the alternating current voltage applied to said motor to further accelerate the motor, then disconnecting said source of direct current from said motor and finally still further increasing the alternating current voltage applied to said motor.

13. In combination, a source of alternating current, a source of direct current, a plurality of series commutator motors interconnected and arranged as a Wheatstone bridge, means for initially connecting said source of direct current across one diagonal of the Wheatstone bridge to start said motors as direct current motors, means for increasing the direct current voltage applied to said motors to increase the speed of said motors, means for connecting said source of alternating current across the other diagonal of said Wheatstone bridge after the applied direct current voltage has been increased with the connection of the direct current source maintained during the acceleration of said motors but without any further increase in the direct current voltage, and means for increasing the alternating current voltage applied to said motors.

14. In combination, a source of alternating current, a source of direct current, a plurality of series commutator motors interconnected and arranged as a Wheatstone bridge, means for initially connecting said source of direct current across one diagonal of the Wheatstone bridge to start said motors as direct current motors, means for increasing the direct current voltage applied to said motors to increase the speed of said motors, means for connecting said source of alternating current across the other diagonal of said Wheatstone bridge after the applied direct current voltage has been increased with the connection of the direct current source maintained during the acceleration of said motors but without any further increase in the direct current voltage, means for increasing the alternating current voltage applied to said motors, means for disconnecting said source of direct current from said motors, and means for further increasing the alternating current voltage applied to said motors after said source of direct current has been disconnected from said motors.

15. In combination, a source of alternating current a source of direct current, a plurality of series commutator motors connected in parallel circuits, means for initially connecting said source of direct current to said motors to start said motors as direct current motors, and means for connecting said source of alternating current to said motors at substantially equipotential points of said circuits with reference to the direct current source, said direct current source being connected at substantially equipotential points of said circuits with reference to the alternating current source.

16. In combination, a source of alternating current, a source of direct current, a plurality of series commutator motors connected in parallel circuits, means for initially connecting said source of direct current to said motors to start said motors as direct current motors, means for increasing the direct current voltage applied to said motors to increase the speed of said motors, and means for connecting said source of alternating current to said motors at substantially equipotential points of said circuits with reference to the direct current source, said direct current source being connected at substantially equipotential points of said circuits with reference to the alternating current source.

17. In combination, a source of alternating current, a source of direct current, a plurality of series commutator motors connected in parallel circuits, means for initially connecting said source of direct current to said motors to start said motors as direct current motors, means for increasing the direct current voltage applied to said motors to increase the speed of said motors, means for connecting said source of alternating current to said motors at substantially equipotential points of said circuits with reference to the direct current source after the direct current voltage has been increased, and said direct current source being connected at substantially equipotential points of said circuits with reference to the alternating current source, and means for increasing the alternating current voltage applied to said motors while maintaining the direct current voltage constant.

18. In combination, a source of alternating current, a source of direct current, a plurality of series commutator motors connected in parallel circuits, means for initially connecting said source of direct current to said motors to start said motors as direct current motors, means for increasing the direct current voltage applied to said motors to increase the speed of said motors, means for connecting said source of alternating current to said motors at substantially equipotential points of said circuits with reference to the direct current source after the direct current voltage has been increased, said direct current source being connected at substantially equipotential points of said circuits with reference to the alternating current source, means for increasing the alternating current voltage applied to said motors while maintaining the direct current voltage constant, means for disconnecting said source of direct current from said motors, and means for further increasing the alternating current voltage applied to said motors after said source of direct current has been disconnected.

In witness whereof, I have hereunto set my hand this 11th day of June, 1924.

ERNST F. W. ALEXANDERSON.